(12) United States Patent
Kim (10) Patent No.: US 12,044,772 B2
(45) Date of Patent: Jul. 23, 2024

(54) APPARATUS AND METHOD FOR GENERATING SENSOR FUSION TRACK

(71) Applicants: Hyundai Motor Company, Seoul (KR); Kia Corporation, Seoul (KR)

(72) Inventor: Seong Hwan Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 417 days.

(21) Appl. No.: 17/547,569

(22) Filed: Dec. 10, 2021

(65) Prior Publication Data

US 2022/0206137 A1  Jun. 30, 2022

(30) Foreign Application Priority Data

Dec. 30, 2020 (KR) .......................... 10-2020-0187400

(51) Int. Cl.
*G01S 13/86* (2006.01)
*G01S 7/41* (2006.01)
*G01S 13/58* (2006.01)

(52) U.S. Cl.
CPC .............. *G01S 13/865* (2013.01); *G01S 7/41* (2013.01); *G01S 13/58* (2013.01)

(58) Field of Classification Search
CPC .... G05D 1/0257; G05D 1/0212; G06V 20/58; G06V 20/588; G06V 10/80; G06V 10/803; G06V 20/56; B60W 2420/408; B60W 2556/35; G01S 13/865; G01S 13/931; G01S 17/931; G01S 13/72; G01S 13/86; G01S 13/58; G01S 17/89; G01S 5/0284; G01S 7/497; G01S 17/58; G01S 2013/93271; G01S 2013/9323
See application file for complete search history.

(56) References Cited

U.S. PATENT DOCUMENTS

| | | | |
|---|---|---|---|
| 11,823,461 B1 * | 11/2023 | Song .................... | G01C 21/265 |
| 2016/0223663 A1 * | 8/2016 | Schmalenberg ...... | G01S 17/931 |
| 2020/0103523 A1 * | 4/2020 | Liu ......................... | G01S 13/89 |
| 2020/0172106 A1 * | 6/2020 | O'Dea .................. | G06V 20/584 |

FOREIGN PATENT DOCUMENTS

WO  WO-2020250020 A1 * 12/2020 ............. G01S 13/52

OTHER PUBLICATIONS

K. Na, J. Byun, M. Roh and B. Seo, "Fusion of multiple 2D LiDAR and RADAR for object detection and tracking in all directions," 2014 International Conference on Connected Vehicles and Expo (ICCVE), Vienna, Austria, 2014, pp. 1058-1059, doi: 10.1109/ICCVE.2014.7297512. (Year: 2014).*

* cited by examiner

*Primary Examiner* — Olumide Ajibade Akonai
(74) *Attorney, Agent, or Firm* — Fox Rothschild LLP (57) ABSTRACT

An apparatus and method for generating a sensor fusion track is provided to generate the same sensor fusion track as actual shape information even when errors in the position/heading information of a reference point of fused sensors are substantial. The apparatus includes an absolute velocity vector calculation module, a LIDAR track angle calculation module, a LIDAR track area search module, and a sensor fusion track generation module.

19 Claims, 8 Drawing Sheets

PRIOR ART

APPARATUS AND METHOD FOR GENERATING SENSOR FUSION TRACK

CROSS REFERENCE TO RELATED APPLICATION(S)

This application claims the benefit of Korean Patent Application No. 10-2020-0187400, filed on Dec. 30, 2020, which is hereby incorporated by reference as if fully set forth herein.

BACKGROUND OF THE INVENTION

Field of the Invention

The present invention relates to a sensor fusion track, and more particularly, to an apparatus and method for generating a sensor fusion track which generates the same sensor fusion track as actual shape information even when errors in the position/heading information of a reference point of fused sensors are substantial.

Discussion of the Related Art

Recently, due to application of an advanced driver assistance system (ADAS), object recognition technology using outputs of various sensors is being vigorously developed. For example, a sensor fusion system which extracts necessary information by combining image information and RADAR information collected by an image sensor and a RADAR sensor has been developed, and high accuracy in the shape information of a target track is required as the level of autonomous driving rises.

The conventional sensor fusion system performs sensor fusion in a manner in which, among output information of cameras and RADAR and LIDAR sensors and various associated and sensory information through a reference point gating method, information having high accuracy is selected. Each track may be shaped using width/length/heading/reference point information, which is shape information provided by the respective sensors. When the shape information of a sensor fusion track generated by selecting associated sensory information after reference point gating is shaped, the generated sensor fusion track may have a different shape from the actual shape information.

The reason for this is that, even when errors in information, such as the position/heading information of the reference point, are large, the sensor fusion track is generated without compensating for the errors.

Figure 1:
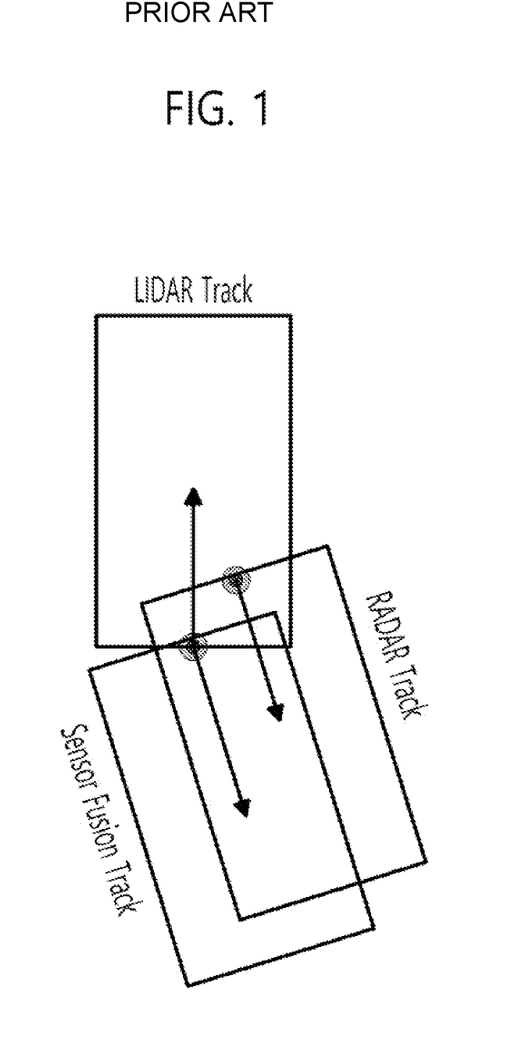
FIG. 1 is a view exemplarily illustrating a conventional sensor fusion track generating using a LIDAR track and a RADAR track.

FIG. 1 is a view exemplarily illustrating a conventional sensor fusion track generated using a LIDAR track and a RADAR track. Referring to FIG. 1, the sensor fusion track is generated through association by gating of a reference point set to the center of the rear bumper of a vehicle, and particularly, the sensor fusion track is generated as a box shape having a width and a length in a heading direction (represented by a red arrow) by setting the reference point to the center of the rear bumper of the vehicle.

In general, the shape information of the LIDAR track has high accuracy, and the velocity information of the RADAR track has high accuracy. The sensor fusion track is generated by selecting information having high accuracy and, since the sensor fusion track is shaped using reference point/width/length/heading information, an error in the shape of the sensor fusion track is increased when the heading error of fused sensors is increased.

SUMMARY OF THE INVENTION

Accordingly, the present invention is directed to an apparatus and method for generating a sensor fusion track that substantially obviate one or more problems due to limitations and disadvantages of the related art. An object of the present invention is to provide an apparatus for generating a sensor fusion track which may generate the same sensor fusion track as actual shape information even when errors in the position/heading information of a reference point of fused sensors are substantial. Another object of the present invention is to provide a method for generating a sensor fusion track in which the same sensor fusion track as actual shape information may be generated even when errors in the position/heading information of a reference point of fused sensors are large.

Additional advantages, objects, and features of the invention will be set forth in part in the description which follows and in part will become apparent to those having ordinary skill in the art upon examination of the following, or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for generating a sensor fusion track may include an absolute velocity vector calculation module configured to calculate an absolute velocity vector of a RADAR track using a relative velocity of the RADAR track and a velocity of a host vehicle, a LIDAR track angle calculation module configured to divide a LIDAR track into a plurality of areas, a LIDAR track area search module configured to determine which one of the areas of the LIDAR track the absolute velocity vector is heading to, and a sensor fusion track generation module configured to generate the sensor fusion track using a box-shaped LIDAR track generated by reflecting information about the area determined by the LIDAR track area search module.

In another aspect of the present invention, a method for generating a sensor fusion track may include calculating an absolute velocity vector of a RADAR track using a relative velocity of the RADAR track and a velocity of a host vehicle, dividing a LIDAR track into a plurality of areas, determining which one of the areas of the LIDAR track the absolute velocity vector is heading to, and generating the sensor fusion track using a box-shaped LIDAR track generated by reflecting information about the area determined by the LIDAR track area search module.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to exemplary embodiments of the present invention, examples of which are illustrated in the accompanying drawings. The disclosure of the invention is not limited to the embodiments set forth herein and may be variously modified. In the drawings, the same or similar elements are denoted by the same reference numerals even when they are depicted in different drawings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Figure 2:
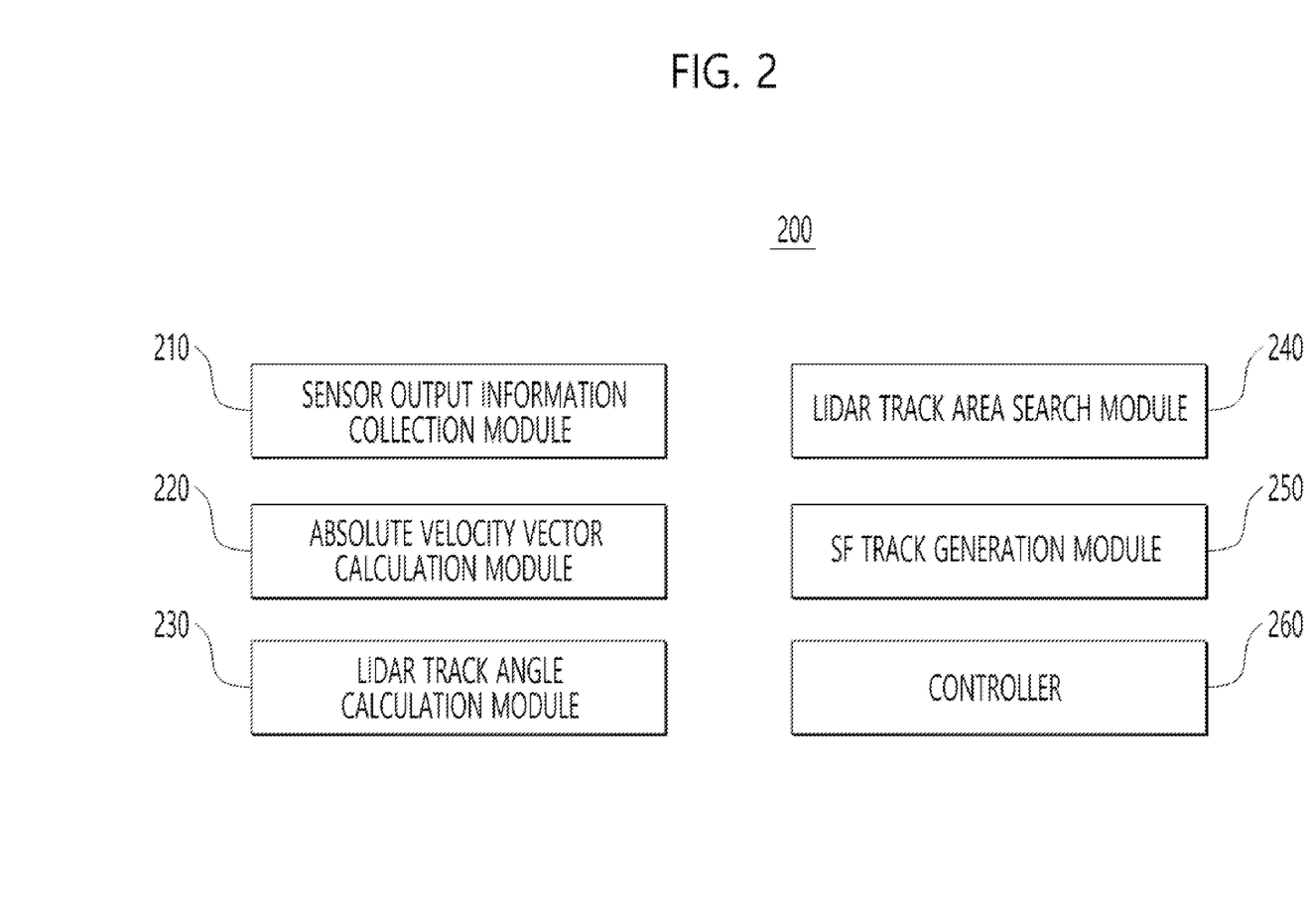
FIG. 2 is a block diagram illustrating an apparatus for generating a sensor fusion track according to one embodiment of the present invention.

FIG. 2 is a block diagram illustrating an apparatus for generating a sensor fusion track according to one embodiment of the present invention. Referring to FIG. 2, an apparatus 200 for generating a sensor fusion track according to the present invention may include a sensor output information collection module 210, an absolute velocity vector calculation module 220, a LIDAR track angle calculation module 230, a LIDAR track area search module 240, a sensor fusion track generation module 250 and a controller 260. The controller 260 may be configured to operate the other components.

The sensor output information collection module 210 may be configured to generate a LIDAR track and a RADAR track using information output from a LIDAR sensor (not shown) and a RADAR sensor (not shown). The absolute velocity vector calculation module 220 may be configured to calculate the absolute velocity vector of the RADAR track. The absolute velocity vector Ab vel of the RADAR track may be calculated by the following Equation 1 using the relative velocity RT vel of the RADAR track and the velocity of a host vehicle.

ALongVel=Sensor ReLongVel+Vehicle LongVel

ALatVel=Sensor ReLatVel+Vehicle LatVel   Equation 1 wherein, ALongVel and ALatVel indicate y-axis and x-axis component vectors of the absolute velocity vector Ab vel, the absolute velocity vector Ab vel is the vector addition of the y-axis component vector ALongVel and the x-axis component vector ALatVel, which will be described below. Sensor ReLongVel and Sensor ReLatVel indicate y-axis and x-axis component vectors of the relative velocity measured by the RADAR sensor, and Vehicle LongVel and Vehicle LatVel indicate y-axis and x-axis component vectors of the velocity of the host vehicle.

Figure 3:
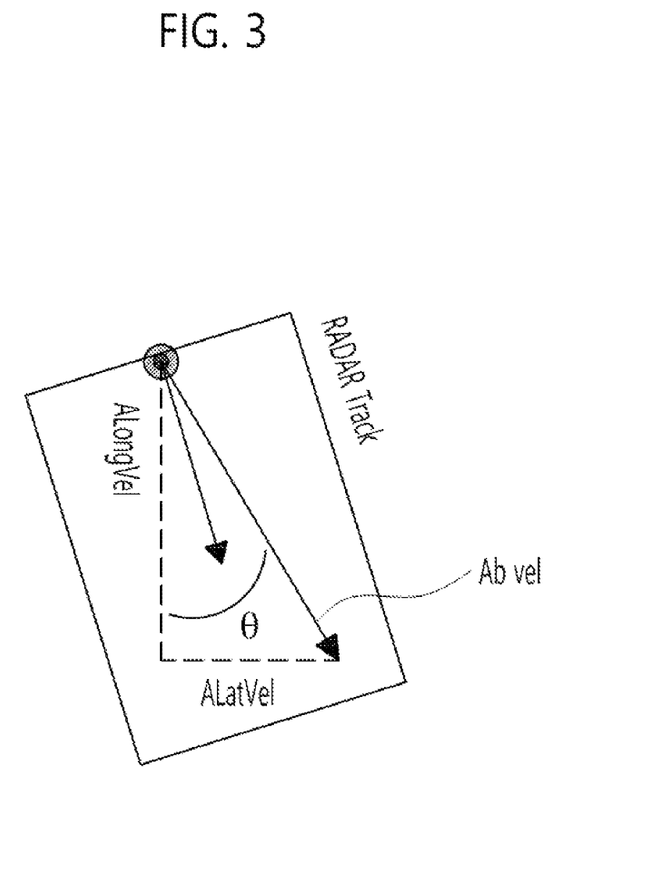
FIG. 3 is a view illustrating an absolute velocity vector of a RADAR track.

FIG. 3 is a view illustrating the absolute velocity vector of the RADAR track. Referring to FIG. 3, it may be confirmed that the y-axis component vector ALongVel and the x-axis component vector ALatVel of the absolute velocity vector Ab vel of the RADAR track calculated using the heading direction (represented by a red arrow) of the RADAR track and the velocity information of the host vehicle form an angle θ. The LIDAR track angle calculation module 230 may be configured to divide the LIDAR track into four areas ①, ②, ③ and ④ using line segments connecting the center of the LIDAR track to four vertexes of the LIDAR track, and calculate LIDAR track angles, i.e., angles formed by the four line segments and a reference axis.

Figure 4:
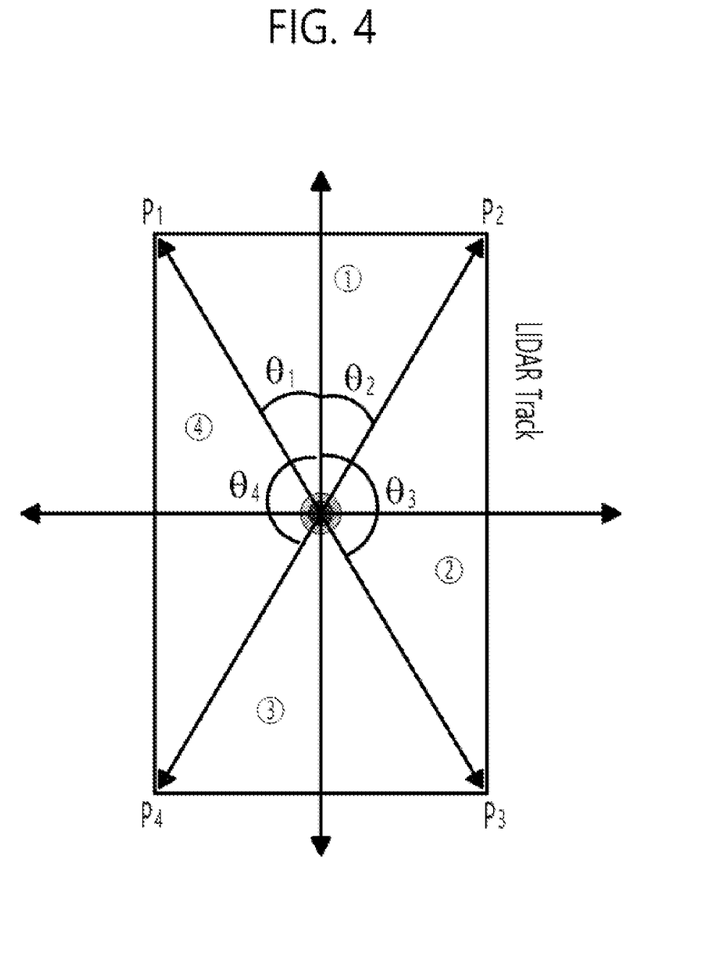
FIG. 4 is a view illustrating four areas generated using line segments connecting the center of a LIDAR track to four vertexes of the LIDAR track.

FIG. 4 is a view illustrating the four areas generated using the line segments connecting the center of the LIDAR track to the four vertexes of the LIDAR track. Referring to FIG. 4, assuming that the four vertexes of the LIDAR tack are referred to as first to fourth vertexes $P_1$ to $P_4$ in the clockwise direction, a line formed by connecting the middle point between the first vertex $P_1$ and the second vertex $P_2$ to the middle point between the third vertex $P_3$ and the fourth vertex $P_4$ is referred to as the reference axis, and the middle point of the reference axis is referred to as the center of the LIDAR track. Angles formed by the center of the LIDAR track and the first to fourth vertexes $P_1$ to $P_4$ are referred to as $\theta_1$ to $\theta_4$.

In other words, the angle formed by the reference axis and the first vertex $P_1$ is the angle $\theta_1$, and the angle formed by the reference axis and the third vertex $P_3$ is the angle $\theta_3$. The first area ① is a plane between two vertexes $P_1$ and $P_2$, the second area ② is a plane between two vertexes $P_2$ and $P_3$, the third area ③ is a plane between two vertexes $P_3$ and $P_4$, and the fourth area ④ is a plane between two vertexes $P_4$ and $P_1$. Although this embodiment describes these planes as having a triangular shape, the shape of the planes may be variously modified.

The LIDAR track area search module 240 may be configured to determine which one of the four areas ① to ④ the absolute velocity vector Ab vel is heading to by comparing the absolute velocity vector Ab vel with the four areas ① to ④ divided from the LIDAR track, and store information regarding the determined area.

Figure 5:
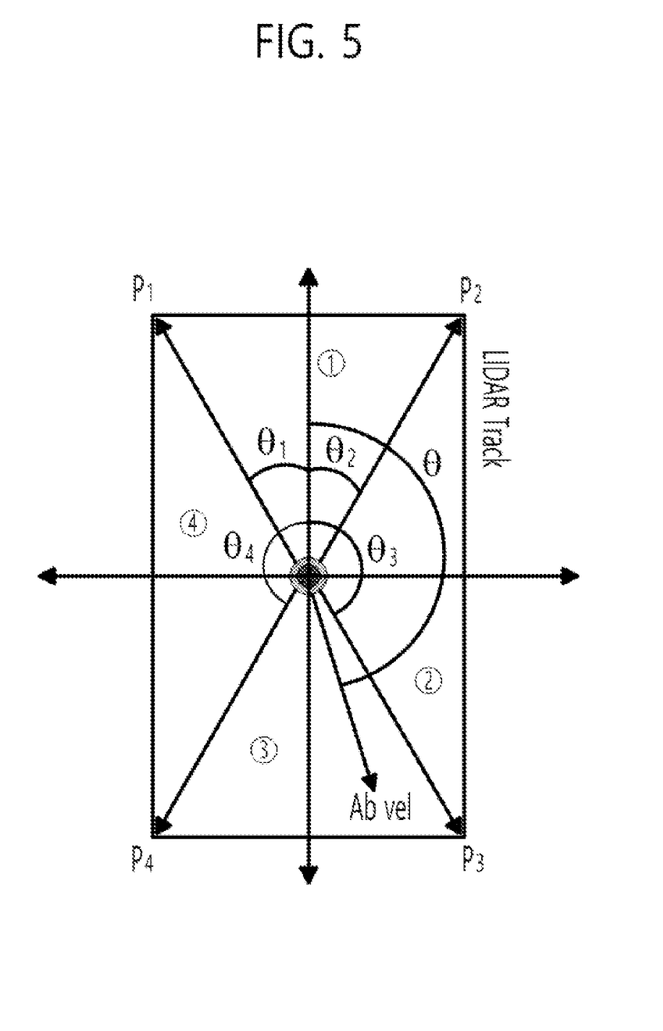
FIG. 5 is a view illustrating relationships between the absolute velocity vector and the four areas of the LIDAR track.

FIG. 5 is a view illustrating relationships between the absolute velocity vector and the four areas of the LIDAR track. Referring to FIG. 5, it may be confirmed that the absolute velocity vector Ab vel is heading, for example, to the third area ③ formed between the third vertex $P_3$ and the fourth vertex $P_4$. The sensor fusion track generation module 250 may be configured to generate new box shape information, i.e., a new LIDAR track, using the information regarding the determined area, and generate a sensor fusion track using the newly generated box-shaped LIDAR track.

In FIG. 5, selection of the third area ③ may be implemented by a method using a heading angle, a width, a length, or an existing point. For example, selection of the third area ③ may be implemented by the method using the heading angle in which the line segment configured to connect the second vertex $P_2$ to the third vertex $P_3$ or the line segment configured to connect the first vertex $P_1$ to the fourth vertex $P_4$ is used, the method using the width in which the distance, i.e., the width, between the first vertex $P_1$ and the second vertex $P_2$ or the width between the fourth vertex $P_4$ and the third vertex $P_3$ is used, the method using the length in which the distance, i.e., the length, between the first vertex $P_1$ and the fourth vertex $P_4$ or the length between the second vertex $P_2$ and the third vertex $P_3$ is used, or the method using the existing point in which the middle point between the first vertex $P_1$ and the second vertex $P_2$ which is the center of the rear bumper of the host vehicle is used.

Figure 6:
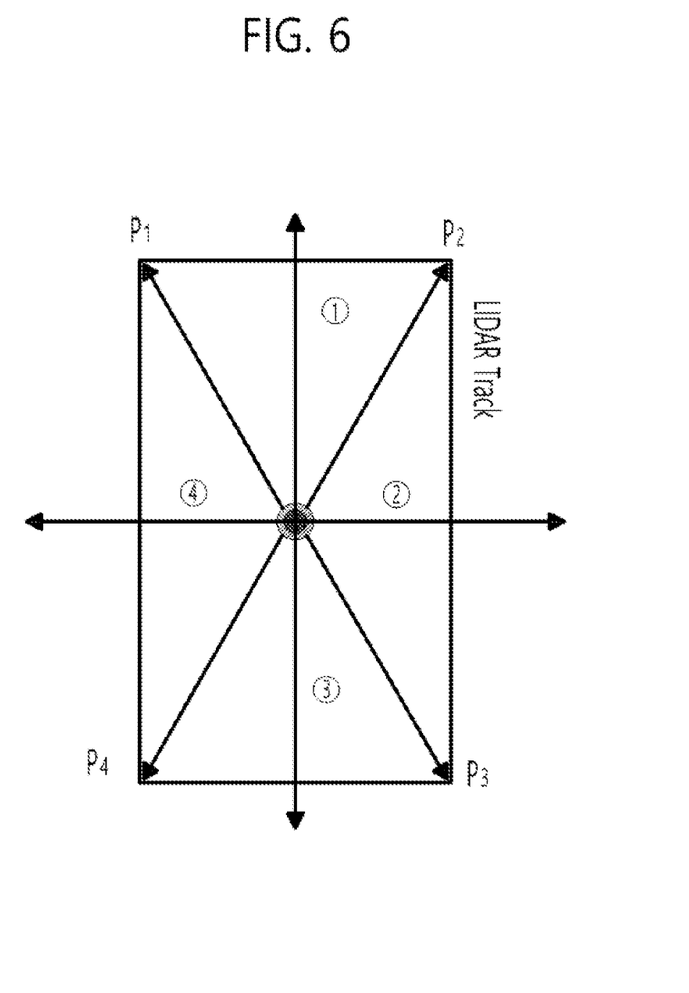
FIG. 6 is a view illustrating one example of a new box-shaped LIDAR track.

FIG. 6 is a view illustrating one example of a new box-shaped LIDAR track. Referring to FIG. 6, it may be confirmed that, in the new LIDAR track, the first area ① is a plane between two vertexes $P_1$ and $P_2$, the second area ② is a plane between two vertexes $P_2$ and $P_3$, the third area ③ is a plane between two vertexes $P_3$ and $P_4$, and the fourth area ④ is a plane between two vertexes $P_4$ and $P_1$.

The controller 260 may be configured to execute the entire operation of the apparatus 200 for generating the sensor fusion track according to the present invention, shown in FIG. 2, and execute not only the operations of the sensor output information collection module 210, the absolute velocity vector calculation module 220, the LIDAR track angle calculation module 230, the LIDAR track area search module 240 and the sensor fusion track generation module 250 but also the operations of other functional modules (not shown in FIG. 2) configured to constitute the apparatus 200 for generating the sensor fusion track.

Figure 7:
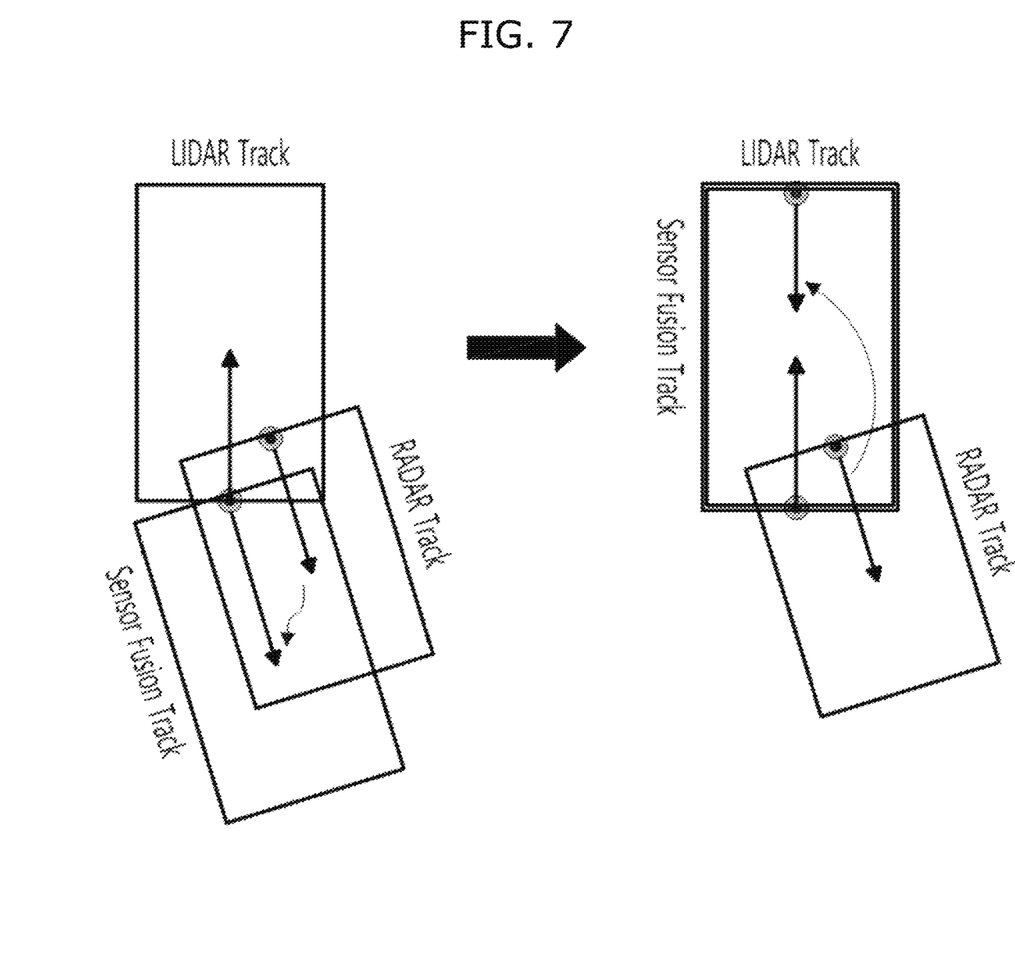
FIG. 7 is a view illustrating one example of generation of a sensor fusion track.

FIG. 7 is a view illustrating one example of generation of a sensor fusion track. It may be confirmed that a sensor fusion track generated by the conventional method does not coincide with a LIDAR track, and particularly, the direction of a velocity vector (represented by plurality of straight arrows) does not coincide with the heading direction of the LIDAR track, as shown in the upper part of FIG. 7. On the other hand, it may be confirmed that, when the shape of a sensor fusion track generated by the apparatus 200 according to the present invention coincides with the shape of a LIDAR track, the direction of a velocity vector (represented by plurality of straight arrows) coincides with the heading direction of the LIDAR track, as shown in the lower part of FIG. 7.

In the conventional method (shown in the upper part of FIG. 7) and the method according to the present invention (shown in the lower part of FIG. 7), the same RADAR track is used, but the finally generated sensor fusion tracks are different. Referring to a black arrow shown in the upper part of FIG. 7 and a black arrow shown in the lower part of FIG. 7, reflection of the absolute velocity vector of the same RADAR track in the respective sensor fusion tracks may be understood.

Figure 8:
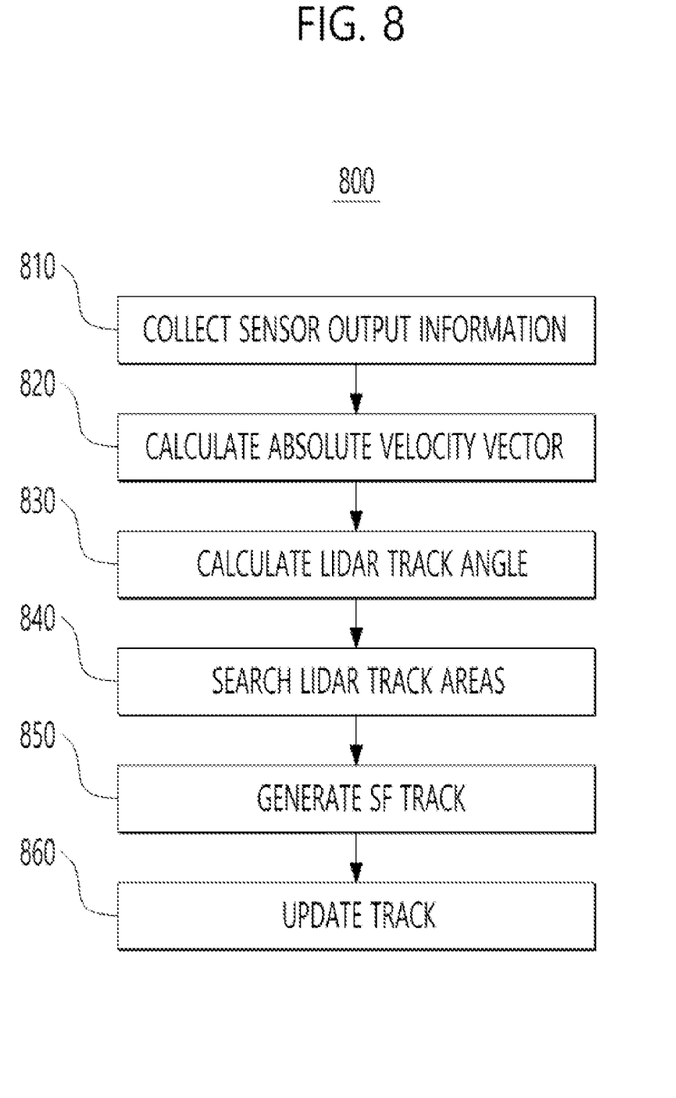
FIG. 8 is a flowchart representing a method for generating a sensor fusion track according to one embodiment of the present invention.

FIG. 8 is a flowchart representing a method for generating a sensor fusion track according to one embodiment of the present invention. Referring to FIG. 8, a method (800) for generating a sensor fusion track according to the present invention may include collecting sensor output information (810), calculating an absolute velocity vector (820), calculating the angle of the vector (830), searching LIDAR track areas (840), generating the sensor fusion track (850), and updating the track (860).

In collection of the sensor output information (810), a LIDAR track and a RADAR track may be generated using information output from a LIDAR sensor and a RADAR sensor. In calculation of the absolute velocity vector (820), the absolute velocity vector Ab vel of the RADAR track generated in collection of the sensor output information (810) may be calculated using the relative velocity (vector) of the RADAR track and the velocity (vector) of a host vehicle.

In calculating the angle of the vector (830), the LIDAR track may be divided into four areas ①, ②, ③ and ④ using line segments connecting the center of the LIDAR track to four vertexes of the LIDAR track, and LIDAR track angles, i.e., angles formed by the four line segments and a reference axis, may be calculated. In particular, assuming that the four vertexes of the LIDAR tack are referred to as first to fourth vertexes $P_1$ to $P_4$ in the clockwise direction, a line formed by connecting the middle point between the first vertex $P_1$ and the second vertex $P_2$ to the middle point between the third vertex $P_3$ and the fourth vertex $P_4$ is referred to as the reference axis, and the middle point of the reference axis is referred to as the center of the LIDAR track.

In search of the LIDAR track areas (840), which one of the four areas ① to ④ the absolute velocity vector Ab vel is heading to may be determined by comparing the absolute velocity vector Ab vel the four areas ① to ④ divided from the LIDAR track, and information regarding the determined area is stored. In generation of the sensor fusion track (850), new box shape information may be generated using the information regarding the determined area. In update of the track (860), the existing box shape information may be updated with the new box shape information generated in generation of the sensor fusion track (850). The updated box shape information is used to a new sensor fusion track.

The present invention may be implemented as computer readable code in a non-transitory computer readable recording medium in which programs are recorded. Such non-transitory computer readable recording media may include all kinds of recording media in which data readable by computer systems is stored. For example, the non-transitory computer readable recording media may include a hard disk drive (HDD), a solid-state drive (SSD), a silicon disk drive (SDD), a ROM, a RAM, a CD-ROM, a magnetic tape, a floppy disk, an optical data storage device, etc.

As is apparent from the above description, an apparatus and method for generating a sensor fusion track may generate the same sensor fusion track as actual shape information even when errors in the position/heading information of a reference point of fused sensors are large.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus for generating a sensor fusion track, the apparatus comprising:
   an absolute velocity vector calculation module configured to calculate an absolute velocity vector of a RADAR track using a relative velocity of the RADAR track and a velocity of a host vehicle;
   a LIDAR track angle calculation module configured to divide a LIDAR track into a plurality of areas;
   a LIDAR track area search module configured to determine which one of the areas of the LIDAR track the absolute velocity vector is heading to; and
   a sensor fusion track generation module configured to generate the sensor fusion track using a box-shaped LIDAR track generated by reflecting information about the area determined by the LIDAR track area search module.

2. The apparatus according to claim 1, further comprising a sensor output information collection module configured to generate the LIDAR track and the RADAR track using information received from a LIDAR sensor and a RADAR sensor.

3. The apparatus according to claim 1, wherein the absolute velocity vector calculation module determines y-axis and x-axis component vectors of the absolute velocity vector through a combination of vector operations of y-axis and x-axis component vectors of the relative velocity of the RADAR track and y-axis and x-axis component vectors of the velocity of the host vehicle.

4. The apparatus according to claim 3, wherein:
   the y-axis component vector of the absolute velocity vector is determined as a value acquired by adding the y-axis component vector of the relative velocity measured by the RADAR sensor and the y-axis component vector of the velocity of the host vehicle, and
   the x-axis component vector of the absolute velocity vector is determined as a value acquired by adding the x-axis component vector of the relative velocity measured by the RADAR sensor and the x-axis component vector of the velocity of the host vehicle.

5. The apparatus according to claim 1, wherein the LIDAR track angle calculation module is configured to divide the LIDAR track into the areas by a method using one of a heading angle, a width, a length and an existing point.

6. The apparatus according to claim 5, wherein the method using the heading angle is executed such that line segments configured to connect a central point of the LIDAR track to respective vertexes of the LIDAR tack and line segments configured to connect neighboring vertexes are used.

7. The apparatus according to claim 5, wherein the method using the width and the method using the length are respectively executed such that, among line segments configured to connect a central point of the LIDAR track to respective vertexes of the LIDAR tack and four line segments configured to connect two neighboring vertexes, two line segments located in parallel so as to have a short distance and two line segments located in parallel so as to have a long distance are used, respectively.

8. The apparatus according to claim 1, wherein the areas include a first area, a second area, a third area and a fourth area, and
   wherein, assuming that four vertexes of the LIDAR tack are referred to as first to fourth vertexes in a clockwise direction:
   the first area is defined as a plane between the first vertex and the second vertex;
   the second area is defined as a plane between the second vertex and the third vertex;
   the third area is defined as a plane between the third vertex and the fourth vertex; and
   the fourth area is defined as a plane between the fourth vertex and the first vertex.

9. The apparatus according to claim 1, wherein the LIDAR track area search module is configured to store the information about the determined area.

10. A method for generating a sensor fusion track, the method comprising:
    calculating, by a controller, an absolute velocity vector of a RADAR track using a relative velocity of the RADAR track and a velocity of a host vehicle;
    dividing, by the controller, a LIDAR track into a plurality of areas;
    determining, by the controller, which one of the areas of the LIDAR track the absolute velocity vector is heading to; and
    generating, by the controller, the sensor fusion track using a box-shaped LIDAR track generated by reflecting information about the area determined by the LIDAR track area search module.

11. The method according to claim 10, further comprising generating the LIDAR track and the RADAR track using information received from a LIDAR sensor and a RADAR sensor.

12. The method according to claim 10, wherein, in the calculating the absolute velocity vector, y-axis and x-axis component vectors of the absolute velocity vector are determined through a combination of vector operations of y-axis and x-axis component vectors of the relative velocity of the RADAR track and y-axis and x-axis component vectors of the velocity of the host vehicle.

13. The method according to claim 12, wherein:
    the y-axis component vector of the absolute velocity vector is determined as a value acquired by adding the y-axis component vector of the relative velocity measured by the RADAR sensor and the y-axis component vector of the velocity of the host vehicle, and
    the x-axis component vector of the absolute velocity vector is determined as a value acquired by adding the x-axis component vector of the relative velocity measured by the RADAR sensor and the x-axis component vector of the velocity of the host vehicle.

14. The method according to claim 10, wherein, in the dividing the LIDAR tracks into the areas, the LIDAR track is divided into the areas by a method using one of a heading angle, a width, a length and an existing point.

15. The method according to claim 14, wherein the method using the heading angle is executed such that line segments configured to connect a central point of the LIDAR track to respective vertexes of the LIDAR tack and line segments configured to connect neighboring vertexes are used.

16. The method according to claim 14, wherein the method using the width and the method using the length are respectively executed such that, among line segments configured to connect a central point of the LIDAR track to respective vertexes of the LIDAR tack and four line segments configured to connect two neighboring vertexes, two line segments located in parallel to have a minimized distance and two line segments located in parallel to have an increased distance are used, respectively.

17. The method according to claim 10, wherein the areas include a first area, a second area, a third area and a fourth area, and wherein, assuming that four vertexes of the LIDAR tack are referred to as first to fourth vertexes in a clockwise direction:

the first area is defined as a plane between the first vertex and the second vertex;

the second area is defined as a plane between the second vertex and the third vertex;

the third area is defined as a plane between the third vertex and the fourth vertex; and the fourth area is defined as a plane between the fourth vertex and the first vertex.

18. The method according to claim 10, further comprising storing the information about the determined area.

19. A non-transitory computer readable recording medium having recorded thereon a program to execute the method according to claim 10.

* * * * *